United States Patent
Ash

(10) Patent No.: US 10,465,415 B2
(45) Date of Patent: Nov. 5, 2019

(54) FENCE PANEL

(71) Applicant: Gary W. Ash, Valley Center, CA (US)

(72) Inventor: Gary W. Ash, Valley Center, CA (US)

( * ) Notice: Subject to any disclaimer, the term of this patent is extended or adjusted under 35 U.S.C. 154(b) by 119 days.

(21) Appl. No.: 15/712,573

(22) Filed: Sep. 22, 2017

(65) Prior Publication Data
US 2019/0093387 A1 Mar. 28, 2019

(51) Int. Cl.
| | | |
|---|---|---|
| *E04H 17/18* | (2006.01) | |
| *E04H 17/16* | (2006.01) | |
| *B60P 7/08* | (2006.01) | |
| *B65G 67/04* | (2006.01) | |
| *E04H 17/06* | (2006.01) | |

(52) U.S. Cl.
CPC .......... *E04H 17/166* (2013.01); *B60P 7/0823* (2013.01); *B65G 67/04* (2013.01); *E04H 17/06* (2013.01)

(58) Field of Classification Search
CPC ..... E04H 17/16; E04H 17/163; E04H 17/165; E04H 17/166; E04H 17/18
See application file for complete search history.

(56) References Cited

U.S. PATENT DOCUMENTS

| | | | | | |
|---|---|---|---|---|---|
| 2,299,143 | A | * | 10/1942 | Hellwig | B23K 1/14 219/107 |
| 3,704,005 | A | * | 11/1972 | Kusel | E04F 11/1834 256/22 |
| 3,787,033 | A | * | 1/1974 | Snyder | E04F 11/1817 256/59 |
| 3,848,855 | A | * | 11/1974 | Weiland | B21D 39/044 256/73 |
| 4,193,377 | A | * | 3/1980 | Weldy | A01K 1/0005 119/502 |
| 4,238,117 | A | * | 12/1980 | Newman | B23K 33/006 256/65.1 |
| 4,351,469 | A | * | 9/1982 | Newman | E04F 11/1817 228/135 |
| 4,537,151 | A | * | 8/1985 | Bolton | A01K 3/00 119/512 |
| 4,953,830 | A | * | 9/1990 | Weaver, III | E04F 11/181 256/19 |
| 5,170,996 | A | * | 12/1992 | Venegas, Jr. | E04F 11/181 256/69 |
| 5,303,900 | A | * | 4/1994 | Zulick, III | E01F 13/024 256/19 |
| 6,553,940 | B1 | * | 4/2003 | Powell | A01K 1/00 119/512 |
| 9,587,414 | B2 | * | 3/2017 | Lachenberg | B23K 1/00 |
| 2007/0252125 | A1 | * | 11/2007 | Thompson | E04H 17/003 256/24 |

* cited by examiner

*Primary Examiner* — Daniel J Wiley

(74) *Attorney, Agent, or Firm* — Todd J. Langford; Greenspoon Marder LLP

(57) ABSTRACT

A fence panel has pinched end connections. The ends of the rails are pinched such that they are flattened from their normal diameter, which are secured to the posts, for example, by welding. A center post may also be used, where its ends are pinched and secured to the middle of the rails. Likewise, additional rails may be utilized, each with pinched ends, and secured to the appropriate posts. The fence panels with pinched ends of particular members may be offset stacked on top of each other to create a nested stack of fence panels that is more stable and compact for transport.

5 Claims, 5 Drawing Sheets

FENCE PANEL

BACKGROUND

This disclosure relates to the general field of fencing, and more specifically toward a fence panel with pinched end connections. The ends of the rails are pinched such that they are flattened from their normal diameter, which are secured to the posts, for example, by welding. A center post may also be used, where its ends are pinched and secured to the middle of the rails. Likewise, additional rails may be utilized, each with pinched ends, and secured to the appropriate posts. The fence panels with pinched ends of particular members may be offset stacked on top of each other to create a nested stack of fence panels that is more stable and compact for transport.

Temporary fence panels are used for a variety of purposes, including construction sites, special events, crowd control, and any other application where free standing portable temporary fencing is desirable. Because of their temporary nature, these fence panels are transported from one location to the next. Accordingly, transportation costs may make up a substantial portion of the total rental cost of temporary fence panels for a particular occasion. Providing fence panels that can be shipped more efficiently will lower the overall cost of implementing a temporary fence panel system.

Thus, there has existed a long-felt need for a fence panel that can be stacked and transported efficiently with many other like fence panels.

SUMMARY

The current disclosure provides just such a solution by having a fence panel with pinched end connections. The ends of the rails are pinched such that they are flattened from their normal diameter, which are secured to the posts, for example, by welding. A center post may also be used, where its ends are pinched and secured to the middle of the rails. Likewise, additional rails may be utilized, each with pinched ends, and secured to the appropriate posts. The fence panels with pinched ends of particular members may be offset stacked on top of each other to create a nested stack of fence panels that is more stable and compact for transport.

An important element to the fence panel disclosed herein is the pinched ends of the rails are welded to the vertical members. Pinching the tubing allows a cup for the next panel to reside therein.

By pinch welding the connections of the rails and posts, the fence panel system operates as a tension and compression system when loaded onto a flat surface, such as a flatbed truck. The straps on the truck may pull the stack of fence panels down as much as eighteen inches on a stack of eighty to one-hundred panels. The chain link is then compressed causing the compression of the stack of fence panels. If the fence panels were welded without such a pinch connection, like one would see on a prior art chain link gate, stacking these panels on the truck causes the stack to be very unstable and not very compressible. With the pinch welds creating nesting cups, the panels are able to be pulled down so the chain link acts like spring. This allows more panels to ship within a shipping container, allows more panels to be ship on trucks to rental companies nationwide, allows the rental companies to get more product to their installations, and is significantly more stable while in transit. In fact, the pinched welded fence panels according to the current disclosure allow one to ship 264 panels in a container instead of 204, because they can be offset stacked and therefore pack denser in the container. Moreover, smaller palletized online orders can be compressed so-as to meet freight companies class 110 weight per cubic square foot requirement.

It is an object of the current disclosure to provide a fence panel that can be shipped efficiently.

It is another object of the current disclosure to provide a method of transporting fence panels.

It is a further object of this disclosure to provide a method of constructing a fence panel that allows for more compact and efficient storage and transportation of a group of like fence panels.

An embodiment of the current disclosure is a fence panel comprising a first post and a second post each with a top and a bottom, a top rail with an end that is pinch welded to the top of the first post and another end that is pinch welded to the top of the second post, a bottom rail with an end that is pinch welded to the bottom of the first post and another end that is pinch welded to the bottom of the second post. The fence panel may further comprise a center post having a top that is pinch welded to a middle of the top rail and a bottom that is pinch welded to a middle of the bottom rail. The fence panel may further comprise a first middle rail and a second middle rail, where an end of the first middle rail is pinch welded to a middle of the first post, where another end of the first middle rail is pinch welded to a middle of the center post, where an end of the second middle rail is pinch welded to a middle of the second post, where another end of the second middle rail is pinch welded to the middle of the center post. The fence panel may further comprise chain link spanning from the first post to the second post and from the top rail to the bottom rail. The first and second post may be made of steel.

A further embodiment of the current disclosure is a fence panel comprising a first post and a second post each with a top and a bottom, a top rail with an end that is pinch welded to the top of the first post and another end that is pinch welded to the top of the second post, a bottom rail with an end that is pinch welded to the bottom of the first post and another end that is pinch welded to the bottom of the second post, and a middle rail with an end that is pinch welded to the middle of the first post and another end that is pinch welded to the middle of the second post.

Another embodiment of the current disclosure is a method of constructing a fence panel comprising the steps of: pinching each end of a top rail and a bottom rail and securing a pinched end of the top rail to a first post, securing another pinched end of the top rail to a second post, securing a pinched end of the bottom rail to the first post, and securing another pinched end of the bottom rail to the second post; and pinching each end of a center post, securing a pinched end of the center post to a middle of the top rail, and securing another pinched end of the center post to a middle of the bottom rail. The method may further comprise the steps of pinching each end of a first middle rail and a second middle rail, securing a pinched end of the first middle rail to a middle of the first post, securing another pinched end of the first middle rail to a middle of the center post, securing a pinched end of the second middle rail to a middle of the second post, and securing another pinched end of the second middle rail to the middle of the center post. The method may further comprise the step of attaching chain link to first post, second post, top rail, and bottom rail.

An additional embodiment of the current disclosure is a method of transporting a plurality of fence panels, where each fence panel comprises a first post and a second post each with a top and a bottom, a top rail with an end pinch welded to the top of the first post and another end pinch welded to the top of the second post, a bottom rail with an end pinch welded to the bottom of the first post and another end pinch welded to the bottom of the second post; a center post with a top and a bottom, where the top of the center post is pinch welded to a middle of the top rail, where the bottom of the center post is pinch welded to a middle of the bottom rail; and a first middle rail and a second middle rail, where an end of the first middle rail is pinch welded to a middle of the first post, where another end of the first middle rail is pinch welded to a middle of the center post, where an end of the second middle rail is pinch welded to a middle of the second post, where another end of the second middle rail is pinch welded to the middle of the center post, the method comprising the steps of: stacking the plurality of fence panels on top of each other such that each fence panel is offset a distance from an adjacent fence panel in a first axis and a second axis, where the first axis is perpendicular to the second axis. The plurality of fence panels may be at least eighty panels. The method may further comprise the step of placing the stacked fence panels onto a truck. The plurality of fence panels may also be stacked onto a truck. The method may further comprise the steps of strapping the plurality of fence panels to the truck; and tightening the straps to compress the fence panels thereby decreasing the total height of the stacked fence panels on the truck.

As used herein, a pinched end refers to a flattened or squished end of a member, such as the end of a pipe or tube that has been flattened such that two sides of the pipe meet or are at least closer together; welding refers to the fabrication process that joins two materials by causing fusion; and a weld is the joint created by the welding process. Accordingly, the term pinch welded refers to welding the pinched end of a member.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

There has thus been outlined, rather broadly, the more important features of the invention in order that the detailed description thereof may be better understood, and in order that the present contribution to the art may be better appreciated. There are additional features of the invention that will be described hereinafter and which will also form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention.

DETAILED DESCRIPTION

Figure 1:
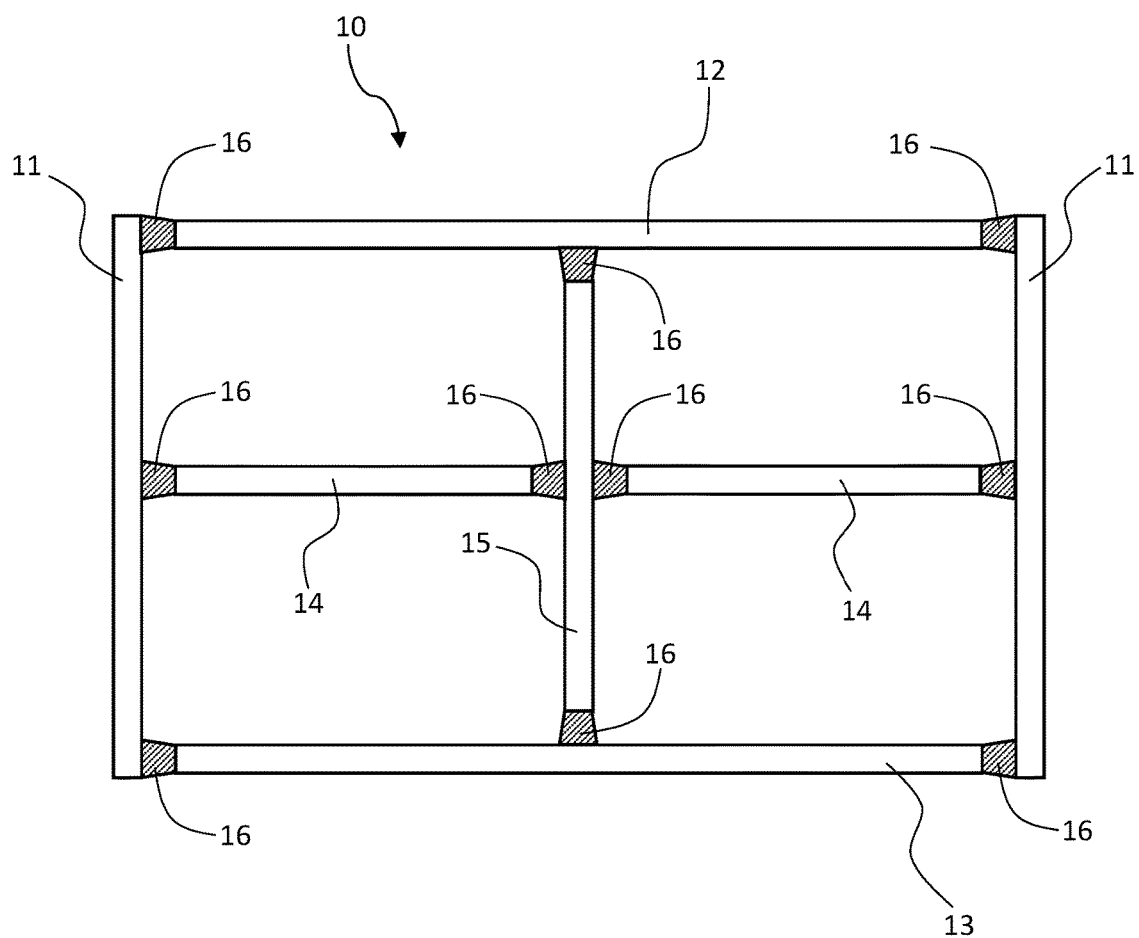
FIG. 1 is a side view of a fence panel according to selected embodiments of the current disclosure.

Many aspects of the disclosure can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

FIG. 1 is a side view of a fence panel according to selected embodiments of the current disclosure. The fence panel 10 includes two posts 11, that is, a first post on the left and a second post on the right. A top rail 12 has two pinched ends 16, each of which is welded to the top of each of the two posts 11. Likewise, a bottom rail 13 has two pinched ends 16, each of which is welded to the bottom of each of the two posts 11.

In certain embodiments, the fence panel may only have the top rail and bottom rail, each with pinched ends, secured to the two posts, for example by welding, with chain link spanning therebetween. However, additional cross or support members may be utilized, as shown in FIG. 1. A center post 15 has two pinched ends 16, each of which is welded to the middle portion of the top rail 12 and bottom rail 13, respectively. Middle rails 14 may also be employed, each with pinched ends. A first middle rail 14 has one end welded to the middle of the left post 11 and to the middle of the center post 15. A second middle rail 14 has one end welded to the middle of the right post 11 and to the middle of the center post 15, though on the opposite side from that of where the first middle rail 14 is welded to the center post 15. Chain link (not shown in this figure) may be secured to the top rail 12 and the bottom rail 13 as well as to each of the post 11, and span therebetween.

Other embodiments provide for a fence panel that has a top rail and a bottom rail, each with pinched ends, secured to the two posts, along with a center post secured to the top rail and bottom rail. Alternatively, embodiments of the current disclosure provide for a fence panel that has a top rail, a bottom rail, and a middle rail, each with pinched ends, secured to the two posts.

Figure 2:
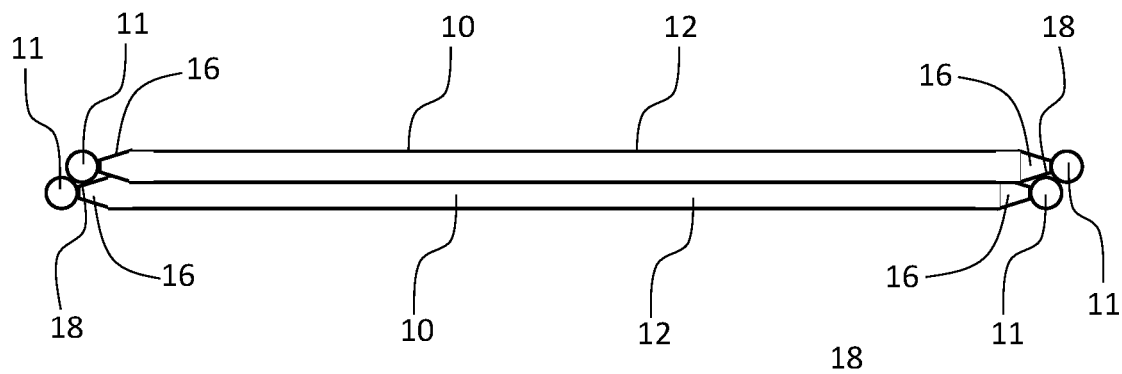
FIG. 2 is a front view of two fence panels stacked together according to selected embodiments of the current disclosure.

FIG. 2 is a front view of two fence panels stacked together according to selected embodiments of the current disclosure. A first fence panel 10 is positioned on top of a second fence panel 10. Each pinched end of the rails creates a cupped area 18 that provides space for a rail 11 of an adjacent fence panel 10. In this view, the panels are shown slightly offset such that the post 11 of one fence panel 10 resides within the cupped area 18 of the adjacent fence panel 10. Without the offset, the posts of 11 and rails of each fence panel would come in contact and not provide for the more space efficient stacking. Moreover, without the cupped areas 18, the posts 11 would come in contact with the outer surface of the rails preventing any nesting and providing for unnecessary space between each fence panel.

Figure 3:
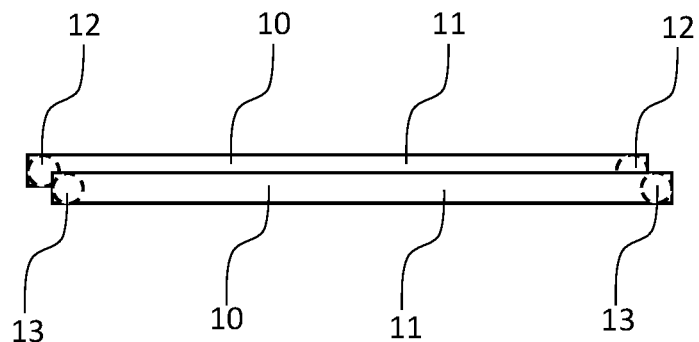
FIG. 3 is a side view of two fence panels stacked together according to selected embodiments of the current disclosure.

FIG. 3 is a side view of two fence panels stacked together according to selected embodiments of the current disclosure. This view is perpendicular to the view of the fence panels in FIG. 2. As shown in this FIG. 3, a fence panel 10 is positioned on top of a second fence panel 10, yet slightly offset from each other. While not necessary for fence panels that only have the two posts, top rail, and bottom rail, the second offset in a perpendicular direction allows for the center rail and middle rails, to also rest within cupped areas formed by the pinched ends of these members.

Figure 4:
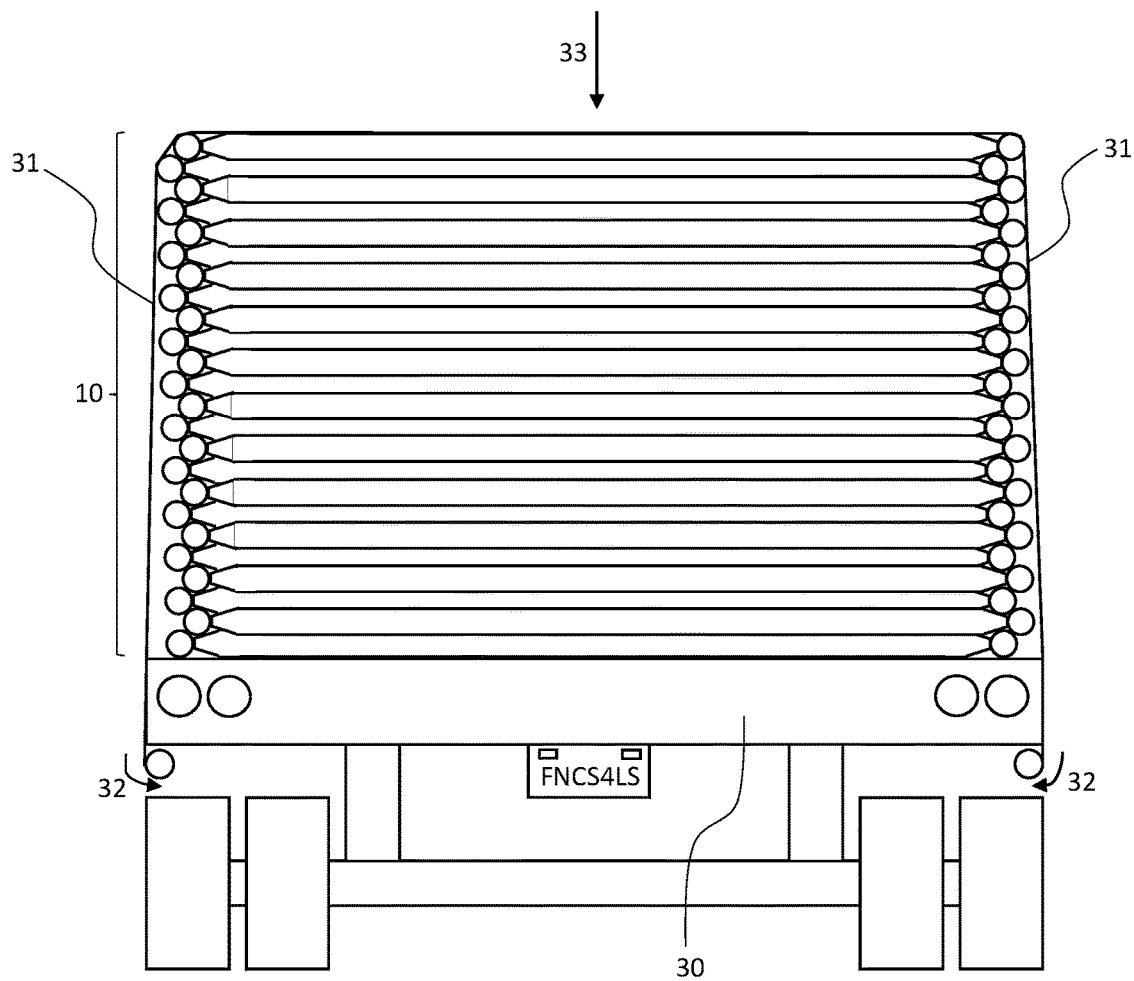
FIG. 4 is a back view of a flatbed truck loaded with fence panels according to selected embodiments of the current disclosure.

FIG. 4 is a back view of a flatbed truck loaded with fence panels according to selected embodiments of the current disclosure. A plurality of fence panels 10 are stacked on a truck 30, which each fence panel 10 offset from the adjacent fence panel 10. One or more straps 31 are wrapped around the fence panel, and tightened, for example, along direction arrow 32. The tightening of the strap 31 pulls the fence panels 10 together, in essence pushing downward along directional arrow 33, thereby reducing the overall height of the stacked fence panels 10, and in turn allowing for a greater number of fence panels to be transported at once.

Figure 5:
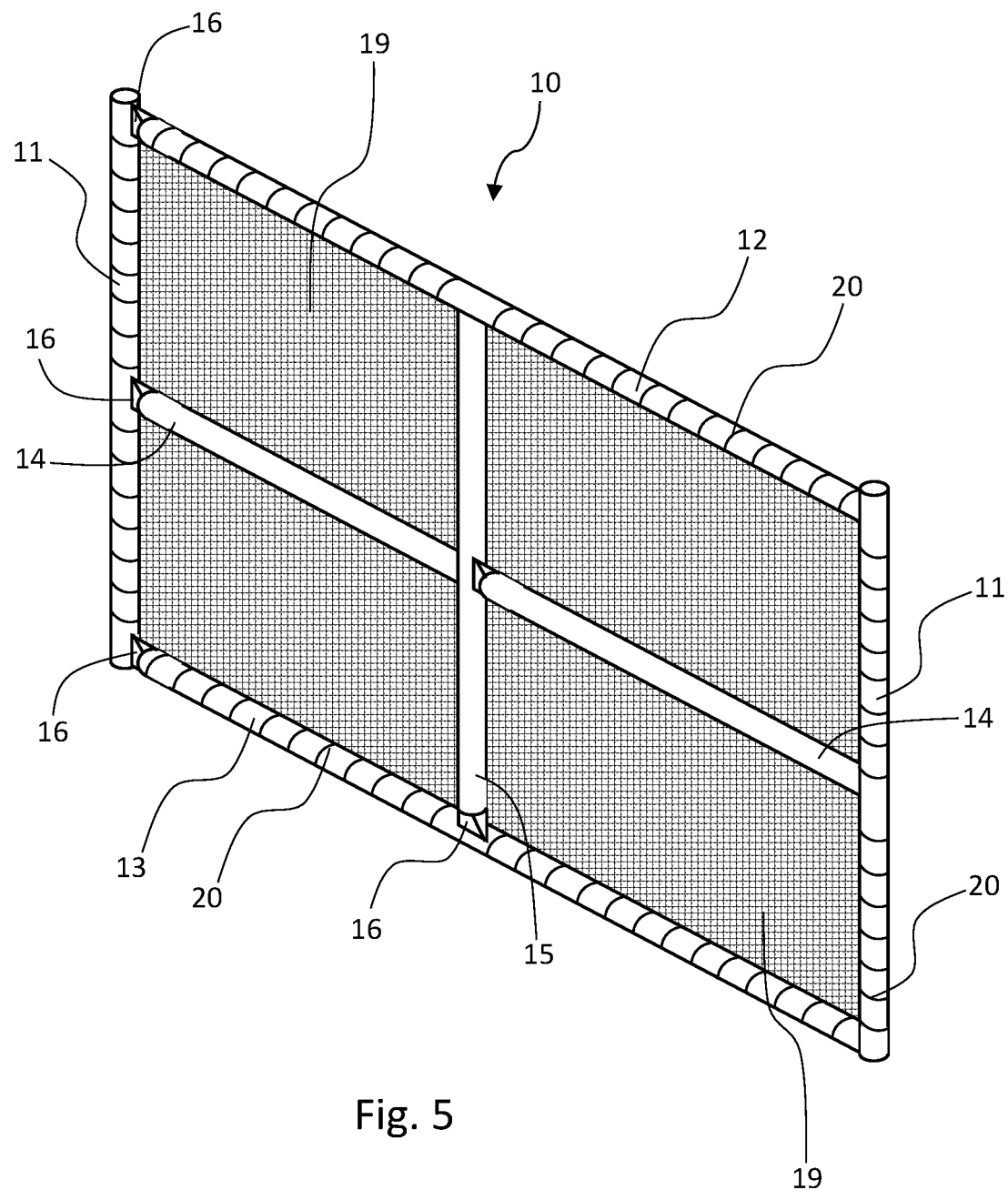
FIG. 5 is a perspective view of a fence panel with chain link according to selected embodiments of the current disclosure.

FIG. 5 is a perspective view of a fence panel with chain link according to selected embodiments of the current disclosure. Chain link 19 spans between and is secured to the two posts 11 and the top rail 12 and bottom rail 13. The chain link 19 spans over the center post 15 and middle rails 14. For example, loops of wire 20 may be used to secure the chain link to the posts 11 and top rail 12 and bottom rail 13.

In an alternative embodiment, the posts and rails are secured together by a process other than welding, for example, by adhesives, screws, bolts, magnets, or other means of fastening. Nonetheless, the pinched ends of certain members still provide for the cupped area and nested stacking of multiple offset fence panels.

Particular embodiments of the current disclosure have posts and rails that have a circular cross section. The main left and right posts along with the top and bottom rails have a diameter of one and five-eighths inches (1⅝"), while the center post and middle rails, if any, have a cross section of one and three-eighths inches (1⅜"). The center post and middle rails are offset from the middle of the main posts and top and bottom rails such that one side of the center post and middle rails is flush with a side of the main posts and top and bottom rails. The chain link is then secured on the opposing side of the center post and middle rails such that it is flush with the opposing side of the main posts and top and bottom rails. This assists in obtaining the spring effect from the chain link when the panels are stacked together. Moreover, certain embodiments provide for center posts and middles rails that do not have pinched ends; rather, they are just directly welded to the opposing member. This is possible because of the smaller diameter of the center post and middle rails relative to the main posts and top and bottom rails, which allows the offset panels to be stacked as disclosed herein.

Figure 6:
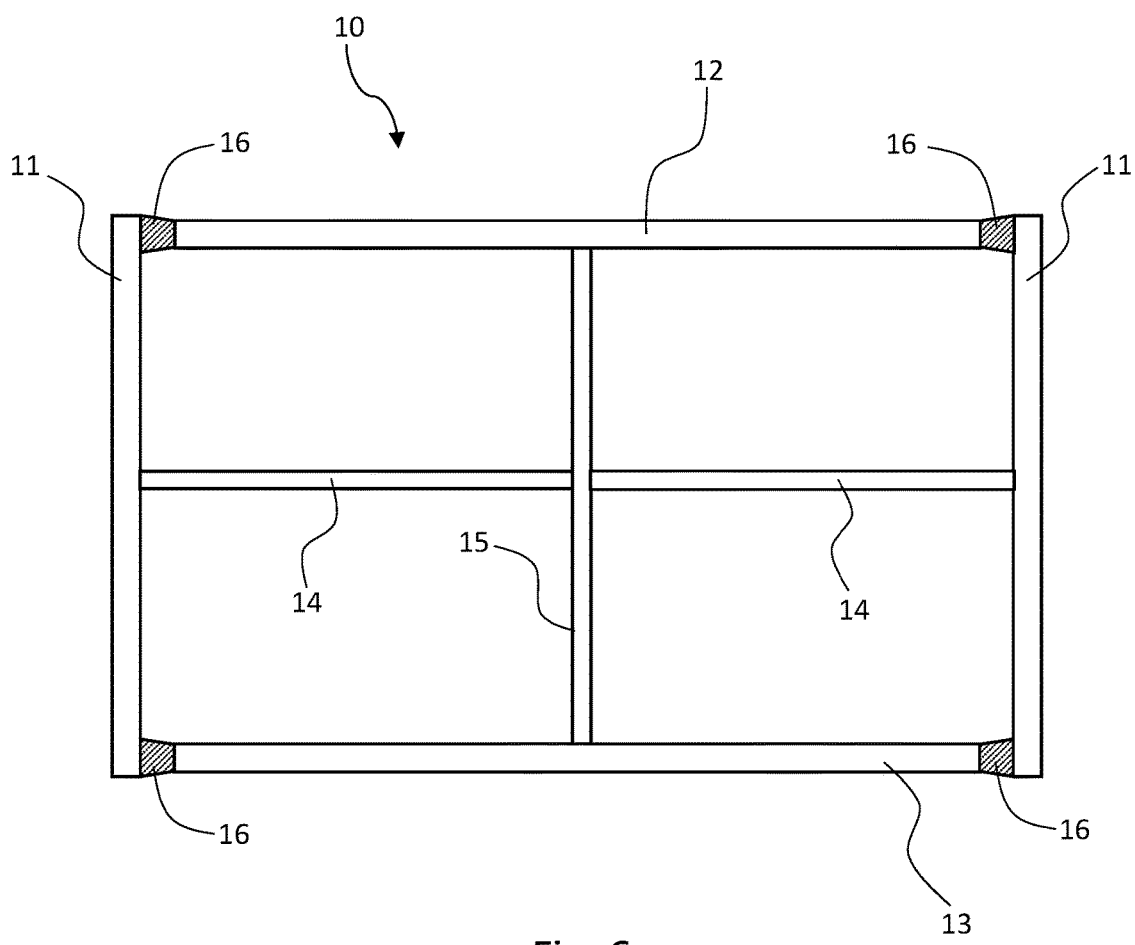
FIG. 6 is a side view of another fence panel according to selected embodiments of the current disclosure.

FIG. 6 is a side view of another fence panel according to selected embodiments of the current disclosure. This embodiment has a center post and middle rails without pinched ends. To allow for appropriate stacking and compression, the center post and middle rails have a cross-section that is smaller than that of the main posts and rails. Thus, the pinched ends of the top and bottom rails allow for offset stacking from one panel to the next, while the smaller diameter middle rails and center post leave sufficient space without themselves requiring pinched ends. The fence panel 10 includes two posts 11, that is, a first post on the left and a second post on the right. A top rail 12 has two pinched ends 16, each of which is welded to the top of each of the two posts 11. Likewise, a bottom rail 13 has two pinched ends 16, each of which is welded to the bottom of each of the two posts 11. A center post 15 has two ends, each of which is welded to the middle portion of the top rail 12 and bottom rail 13, respectively. Note, however, that the ends of the center post 15 are not pinched; rather, a cup-weld or other techniques of attachment may be used to secure the center post to the rails. Middle rails 14 may also be employed, each without pinched ends. A first middle rail 14 has one end welded to the middle of the left post 11 and to the middle of the center post 15. A second middle rail 14 has one end welded to the middle of the right post 11 and to the middle of the center post 15, though on the opposite side from that of where the first middle rail 14 is welded to the center post 15. Chain link (not shown in this figure) may be secured to the top rail 12 and the bottom rail 13 as well as to each of the posts 11, and span therebetween. In a particular embodiment, the diameter of the middle rails and center post are eighty-five percent of the diameters of the main posts and rails. In another embodiment, the diameter of the middle rails and center rails are eight percent of the diameter of the main posts and rails.

A circular cross section for the posts and rails are discussed above; however, it must be appreciated that other cross sections are possible without departing from the scope of the current disclosure, for example square, triangular, rectangular, and elliptical. The chain link as shown herein is a diamond pattern chain link; however, the chain link may also be made of horizontal and vertical wires connected together into a square grid pattern. Furthermore, the chain link may implement other patterns, such as hexagonal, and/or include other elements, such as slats or tarps to decrease the visibility through the fence.

While various embodiments of the present disclosure have been described above, it should be understood that they have been presented by way of example only, and not of limitation. Likewise, the various diagrams may depict an example architectural or other configuration for the embodiments, which is provided to aid in understanding the features and functionality that can be included. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present disclosure. Additionally, with regard to flow diagrams, operational descriptions and method claims, the order in which the steps are presented herein shall not mandate that various embodiments be implemented to perform the recited functionality in the same order unless the context dictates otherwise.

Although this disclosure is presented in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What I claim is:

1. A method of transporting a plurality of fence panels, where each fence panel comprises a first post and a second post each with a top and a bottom, a top rail with an end pinch welded to the top of the first post and another end pinch welded to the top of the second post, a bottom rail with an end pinch welded to the bottom of the first post and another end pinch welded to the bottom of the second post; a center post with a top and a bottom, where the top of the center post is pinch welded to a middle of the top rail, where the bottom of the center post is pinch welded to a middle of the bottom rail; and a first middle rail and a second middle rail, where an end of the first middle rail is pinch welded to a middle of the first post, where another end of the first middle rail is pinch welded to a middle of the center post, where an end of the second middle rail is pinch welded to a middle of the second post, where another end of the second middle rail is pinch welded to the middle of the center post, the method comprising the steps of:

stacking the plurality of fence panels on top of each other such that each fence panel is offset a distance from an adjacent fence panel in a first axis and a second axis, where the first axis is perpendicular to the second axis.

2. The method of claim 1, wherein the plurality of fence panels are at least eighty panels.

3. The method of claim 1, further comprising the step of placing the stacked fence panels onto a truck.

4. The method of claim 1, wherein the fence panels are stacked onto a truck.

5. The method of claim 4, further comprising the steps of strapping the plurality of fence panels to the truck; and tightening the straps to compress the fence panels thereby decreasing the total height of the stacked fence panels on the truck.

* * * * *